United States Patent [19]

Langlois

[11] Patent Number: 4,740,863

[45] Date of Patent: Apr. 26, 1988

[54] CURRENT-LIMITING THIN FILM TERMINATION FOR CAPACITORS

[75] Inventor: Marc Langlois, Oro Valley, Ariz.

[73] Assignee: SFE Technologies, San Fernando, Calif.

[21] Appl. No.: 50,614

[22] Filed: May 15, 1987

[51] Int. Cl.⁴ .................. H01G 1/14; H01G 7/00; H01G 4/10

[52] U.S. Cl. ...................... 361/309; 29/25.42; 361/321

[58] Field of Search ............ 361/272, 274, 275, 323, 361/308, 309, 310, 320, 321; 29/25.42

[56] References Cited

U.S. PATENT DOCUMENTS

| | | | |
|---|---|---|---|
| 3,549,956 | 12/1970 | Polie | 361/308 X |
| 4,458,294 | 7/1984 | Womack | 361/321 |
| 4,533,975 | 8/1985 | Bill | 361/323 |
| 4,555,746 | 11/1985 | Mochizuki et al. | 361/323 |
| 4,604,676 | 8/1986 | Senda et al. | 361/321 X |

FOREIGN PATENT DOCUMENTS 1163434  9/1969  United Kingdom ............... 361/275

Primary Examiner—Donald A. Griffin
Attorney, Agent, or Firm—Christie, Parker & Hale

[57] ABSTRACT

A small multilayer capacitor, such as an MLC capacitor, has in one of its end terminations a passivation layer surrounded by nested sputter-coated metallization films to provide a safeguarding feature so that the capacitor will not fail short. A process for providing the terminations at the ends of chips for such small MLC capacitors includes applying at least three nested thin films of metallization at the opposite ends of each chip and over the surface of the chip between the ends, and forming the passivation layer before applying the outer nested films, and finally removing a portion of thin films of metallization material intermediate the ends, to provide an MLC capacitor having proper metallized end terminations. Preferably, the thin films are applied to cover the entire surface of each chip by sputtering thin film material onto a batch of tumbling chips.

21 Claims, 1 Drawing Sheet

CURRENT-LIMITING THIN FILM TERMINATION FOR CAPACITORS

CROSS REFERENCE TO RELATED APPLICATION

This application is related to a commonly assigned copending application, filed May 15, 1987, U.S. Pat. Ser. No. 05,883, entitled "End Terminations For Capacitors," the disclosure of which is hereby incorporated herein by reference.

BACKGROUND OF THE INVENTION

The present invention relates to monolithic multilayer capacitors such as monolithic multilayer ceramic (MLC) capacitors, and, more particularly, to such a capacitor incorporating a new and highly advantageous thin film end-termination.

A monolithic multilayer capacitor includes a body portion, referred to herein as a "chip," and also includes a pair of end terminations. Such a capacitor has a stacked configuration in contrast to a wound configuration. In the stacked configuration, there are alternating conductive and dielectric layers, with the conductive layers defining first and second sets. These layers are contained in the chip. In the capacitor, all the conductive layers in the first set are electrically connected together at one end of the chip by one of the pair of end terminations; all the conductive layers in the second set are electrically connected together at the opposite end of the chip by the other of the pair of end terminations.

Various types of materials can be used to make a monolithic multilayer capacitor. When ceramic is used as the dielectric, the capacitor is referred to as a monolithic ceramic (MLC) capacitor. Each ceramic layer in an MLC capacitor is very thin, typically only about from 0.0005 inch to 0.003 inch thick. Each conductive layer in an MLC capacitor is also very thin, and is made from a material that has high temperature stability so as to be able to withstand high temperature conditions during processing steps which are carried out in the course of making the laminated or multilayer chip. A platinum/palladium alloy is commonly used for the conductive layers because layers of such material are capable of withstanding such relatively high temperatures.

In use, with voltage applied to the capacitor, an electric field is established between the film electrodes within this thick-film ceramic-electrode layer structure. Occasionally, minor defects in a ceramic dielectric layer allow small leakage currents to flow through the defective dielectric layer, with the result that the temperature of the ceramic rises due to $I^2R$ heating. Leakage currents tend to increase with increasing temperature, and the whole body becomes progressively hotter. Ultimately, such a runaway situation causes the ceramic layer to break down, and thus MLC capacitors tend to fail by developing electric shorts between adjacent conductive layers.

In recent years, it has become increasingly common to employ many MLC capacitors on a single printed circuit board which also supports a large number of integrated circuit components, for example, MOS memory chips. The MLC capacitors are typically connected directly across a low voltage power supply which has a large current capacity. Such printed circuit boards are typically quite costly. When any one of the many MLC capacitors fails, as described above, its temperature can easily exceed 1,000° C., thus causing ignition and burning of nearby components, and often burning through the supporting board, and possibly causing burning of the boards which are adjacent the board on which the failed MLC capacitor is mounted.

In a typical application, an MLC capacitor functions in the manner of decoupling the power supply from the active components of the electronic circuit, such as integrated circuit (IC) chips, with which the MLC capacitor is used. Typically, this means that the capacitor is connected across the power supply to prevent transmission of any undesirable high frequency components in the power supply output to the integrated circuit components. Thus, with the capacitor connected across the power line, if it fails due to shorting between adjacent electrodes, DC current flows directly through the capacitor, first causing the MLC capacitor to burn, and next causing the IC or other adjacent chip to burn.

The above-described fire-hazard problem does not plague some other types of capacitors such as metallized film capacitors, for example, even though localized defects can occur in any dielectric layer in a metallized film capacitor. Characteristically, metallized film capacitors that have localized defects in a dielectric layer tend to degrade rather than completely fail. This is so because any unduly large leakage current, which flows from one metallized layer through a defect in the adjacent dielectric film to the next adjacent metallized film, burns a hole in at least one of these two metallized layers, thereby breaking the undesired DC conduction path. This opening of the undesired DC conduction path prevents a runaway failure. With other metallized layers, separated by dielectric layers, remaining functional, the capacitor as a whole remains functional, albeit with a lower capacitance.

A second problem encountered with MLC capacitors having defective ceramic layers is that a repetitive but intermittent failure results in a momentary short between electrodes of the MLC capacitor, and then a remission occurs, with the result that a considerable amount of high frequency electric interference is created in the electronic circuitry in which the MLC capacitor is utilized.

Various approaches have been taken in attempts to solve the above-described problems. Elaborate precautions in the form of fire protection systems have been taken in systems such as computer systems containing circuit boards using the MLC capacitors. Further, some designers have utilized different fusible types of elements in series with the capacitor in order to prevent the occurence of the problems which can occur when a capacitor fails short and burns up. Incorporating a fusible element into a capacitor makes the capacitor package both bulky and expensive. In addition, it interferes with its performance and can have the effect of increasing the inductance of the capacitor to the point where, in some cases, the detraction from the performance of the capacitor is such that a fuse can't be used. In addition, fuses have a characteristic which is referred to as equivalent series resistance (ESR). In most instances, the fuses or fusible elements have an ESR which is too high, and the result is that the performance of the capacitor, particularly at high frequencies, is diminished greatly by the inherent ESR of the fusible elements and the extraneous inductance which the element introduces.

Other examples of the manner in which this problem has been addressed are shown in U.S. Pat. Nos. 4,107,759 and 4,193,106. In general, approaches to the problem such as provided by the foregoing two patents all involve additional circuit elements and structural features, including external connections, false terminations, separate fusible wires, soldered or welded connections, or require encapsulation.

SUMMARY OF THE INVENTION

The present invention provides a new and highly advantageous solution to the above-described problem that has heretofore plagued multilayer capacitors, such as MLC capacitors, that fail short. According to the invention, the capacitor is provided with a thin film end termination that safeguards against the runaway firehazard problem.

The invention can be defined in terms of a multilayer capacitor having the safeguarding end termination and in terms of a process for making such a capacitor.

A multilayer capacitor embodying the invention comprises a multilayer capacitor chip and end terminations having certain features. The multilayer capacitor chip contains first and second sets of conductive layers and alternating dielectric layers, with each of the layers of the first set having an edge defined at one end of the chip and with each of the layers of the second set having an edge defined at the opposite end of the chip. First and second end terminations are provided. The first end termination electrically connects together all the conductive layers of the first set at one end of the chip and the second end termination electrically connects together all the conductive layers of the second set at the opposite end of the chip. The first end termination includes a plurality of nested metallization films; preferably, the second end termination likewise includes such a plurality of nested metallization films. At least the first end termination further includes an intermediate passivation layer, and is configured such that the innermost of the nested metallization films has a portion that forms part of a circuit path bypassing the intermediate passivation layer and has a portion that cooperates with the edges of the conductive layers of the first set to define parallel circuit paths, so that flow of current through one of the parallel circuit paths in excess of a currentlimiting value causes that path to open, leaving other parallel circuit paths intact.

The invention can also be defined in terms of a process, in which end terminations are produced on a multilayer capacitor chip. As in the copending commonly assigned application cross referenced above, a process in accord with the present invention provides for sequentially forming a plurality of sputter-coated metallization films. Each such sputter-coated metallization film not only overlays the opposite ends of the chip and but also extends between the opposite ends. The first such formed metallization film is in direct contact with each of the edges of the conductive layers contained in the chip. In an ensuing film partialremoval step, metallization films are removed from the chip intermediate its ends sufficiently to eliminate every direct-current conductive path around the outside of the chip from one end to the other, leaving the metallization films on and surrounding each end thereof for electrical connection of the capacitor to external electrical circuitry. In accord with this invention, there are included at least three, and preferably four, sputter-coating steps to produce nested metallization films, and there is an additional step of providing an intermediate passivation layer.

In the preferred practice of this process, one of the two innermost sputter-coated metallization films comprises aluminum, the other of these two comprises palladium, and each of these two films has a thickness of approximately 250 Angstroms. After forming these two metallization films to the desired thickness, the next step in the preferred practice of the process is to passivate one end of the chip. Preferably, fully idimized polyamide in solution is applied and then dried to form a passivation layer having a thickness in the range of approximately 1 to 3 mils (0.001" to 0.003"). Alternatively, the passivation layer is applied using a dielectric epoxy system utilizing ultra-violet curing. Instead of drying, epoxy material is exposed to high intensity ultraviolet radiation which initiates the curing cycle. In either case, a thin layer of insulating dielectric is provided. After forming the passivation layer, the next step in the preferred practice of the process is to form, in sequence, two more sputter-coated metallization films so that each of these two sputter-coated metallization films not only overlays the opposite ends of the chip but also extends between the opposite ends. The portions of the outer metallization films that extend between opposite ends of the chip cooperate with similarly extending portions of the inner metallization films to provide a circuit path bypassing the intermediate passivation layer. Preferably, one of these two outer sputter-coated metallization films comprises a nickel-copper alloy, and the other comprises a tin-lead alloy. Preferably, each of these two formed films has a thickness of approximately 50,000 Angstroms (5 microns).

The invention can also be defined in terms of particularly preferred, advantageous features, and in a highvolume production context. In these terms, the invention is a process for producing an end termination at each opposite end of many multilayer capacitors, and comprises the steps of loading a plurality of capacitor chips to be terminated into an evacuable enclosure. Thereafter, the chips are heated, and tumbled by rotating the enclosure. While the chips are being heated and tumbled, the enclosure is evacuated to produce a vacuum suitable for sputtering metallic material onto the chips. Thereafter, an inert gas is introduced into the enclosure, and, while the chips continue to tumble, a first metallic material is sputtered to form a sputtercoated metallization film covering the entire exterior surface of each of the chips. This film, which preferably comprises aluminum, is in direct contact with the edges of the conductive layers contained within the chip it covers. Next, a second metallic material is sputtered while the chips tumble to form a sputter-coated metallization film covering the entire exterior surface of each of the chips. This film preferably comprises palladium.

The next step in the process is to passivate each of the chips at one of its ends. To prepare for this, the evacuable enclosure is vented and the chips are cooled and removed from the evacuable enclosure. The passivation layer is then applied to one end of the capacitor overlying the portion of the thin films of aluminum and palladium at the end of the chip. After drying and/or curing the passivation layer, the chips are thereafter processed in the same manner as described and claimed in the copending application cross referenced above. That is, two additional sputter-coated metallization films are formed covering the entire exterior surface of each chip, and then each chip is subjected to a metallization film material removal step to remove such material intermediate the ends of the chip. Each resulting capacitor has nested thin film end terminations, i.e., a plurality of nested metallic coatings on opposite ends of the capacitors (with one end being passivated) for electrical connection of the capacitor to external electrical circuitry. Further, each of the many capacitors produced has a safeguarding feature such that the capacitor does not short out as a result of a defect in one of the dielectric layers contained in the chip.

These and other distinguishing and advantageous features of the invention are described in detail below and recited in the appended claims.

DESCRIPTION OF SPECIFIC EMBODIMENTS

Figure 1:
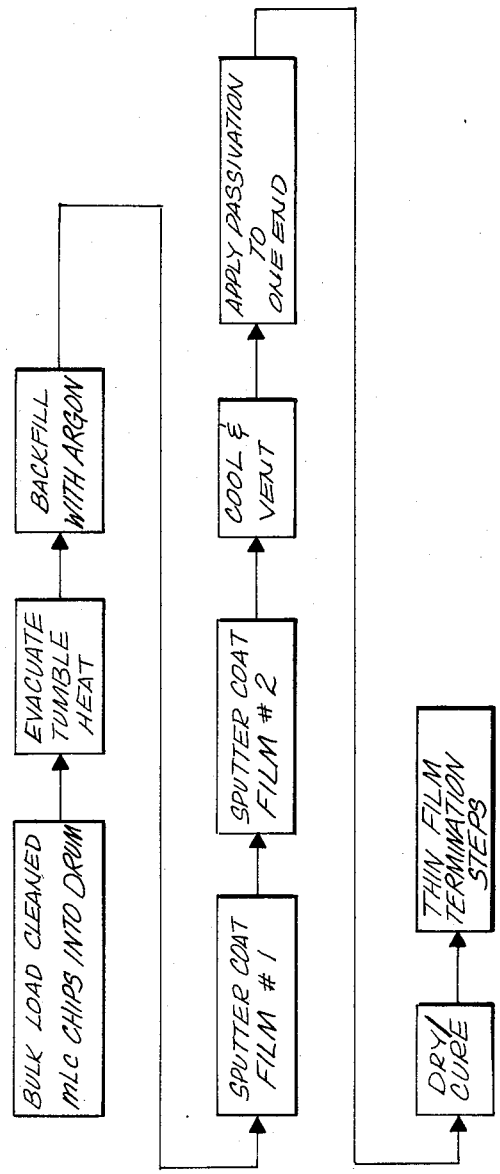
FIG. 1 is a process flow diagram of the thin-film termination and passivation process in accord with the presently preferred practice of the process of this invention.

As shown in FIG. 1, the components that are to be provided with end terminations in the preferred practice of this invention are monolithic multilayer ceramic (MLC) capacitor chips. The MLC chips are first cleaned to remove contamination and impurities from their surfaces. These chips are bulk loaded (i.e., poured) into a drum suitable for use in low-pressure sputtering operations. Such suitable drums are commonly used in a variety of such low-pressure sputtering operations. The drum is then evacuated and heat is applied to the drum while the chips in the drum are tumbled. Typically, the pressure in the drum is reduced to approximately $10^{-6}$ Torr. The heat applied to the drum raises the temperature of the tumbling chips to de-gas (remove water, mainly) the chips and to take advantage of the well-known fact that sputtering operations are improved by having relatively hot surfaces to receive the sputter coating. A suitable temperature for the chips is 200° C. After the drum has been heated sufficiently to so that the chips reach the proper temperature, and the desired level of vacuum has been achieved, a flow of argon gas is back-filled into the drum to provide an inert gas atmosphere in the enclosure. A sufficient flow of argon is introduced into the drum to increase the pressure in the evacuated drum to a range of between 1 to $5 \times 10^{-3}$ Torr.

The MLC chips are now ready to receive the first coating of a conductive material which is one of the components of each end termination.

A suitable arrangement is provided for carrying out sputtering operations within the drum. One suitable arrangement involves disposing a target plate (also called a sputtering cathode) within the drum, and wiring the target plate to an external high voltage source to charge the target plate negatively relative to the drum. As is well known, a gas such as argon within such a drum becomes ionized as a result of the high potential difference, so as to become a plasma source of ions that bombard the target and cause the target to act as a sputtering gun. In the specific process practice being described, the target plate used in the sputtering operation to produce the first coating on the chips is aluminum.

As the chips are tumbled, a sufficient quantity of aluminum is sputter coated onto the chips to achieve a deposition to a uniform thickness of 250 Angstroms of aluminum over the entire exterior surface of each of the MLC chips in the drum.

After a uniform coating of the aluminum has been achieved to the desired thickness of 250 Angstroms, a sputtering gun is then utilized to form a second film or component of the end termination. In this case, the material utilized is palladium and again the sputtering operation takes place while the MLC chips are being tumbled, so that a uniform coating to a thickness of 250 Angstroms of the palladium is uniformly deposited over the entire surface of each of the MLC chips in the drum. When the desired 250 Angstrom coating of palladium on the MLC chips has been achieved, the sputtering gun is cut off.

Preparatory to the next step, the drum is cooled and vented to lower the temperature to room temperature and the pressure to atmospheric pressure.

The next step in the process is to passivate the MLC chips. A passivation is applied to one end of the MLC chip. This is done outside of the vacuum chamber. The preferred passivation is fully idimized polyamide in solution. Examples are M & T Chemical's #2065-40 and #5000-10. Additions of Siloxane and other modifiers are used to optimize this step of the process. The polyamides require simple drying to form a thermoplastic dielectric (insulation) layer. Alternatively, the passivation layer is applied using a dielectric epoxy system utilizing ultra-violet curing. Instead of drying, epoxy material is exposed to high intensity ultraviolet radiation which initiates the curing cycle. In either case, a thin layer of insulating dielectric is provided. The preferred thickness ranges between 1 and 3 mils (0.001 and 0.003 inches).

Thereafter the MLC chips are processed so that there are sputter-coated, in sequence, a nickel-copper alloy film and then a thin-lead alloy film onto each MLC chip. Then the chips are burnished. The copending commonly assigned application cross referenced above contains additional details concerning the presently preferred way to carry out these steps.

Following the burnishing step, the MLC chips are then removed from the tumbling drum and each of the MLC chips is machined, by abrasive machining, laser trimming, a jet of high-pressure water, or the like, to remove the metallization films from a band area around the MLC chips, leaving only the end portions of the MLC capacitors coated with the plurality of end termination films of aluminum, palladium, passivation (one end), nickel alloy and tin-lead.

Figure 2:
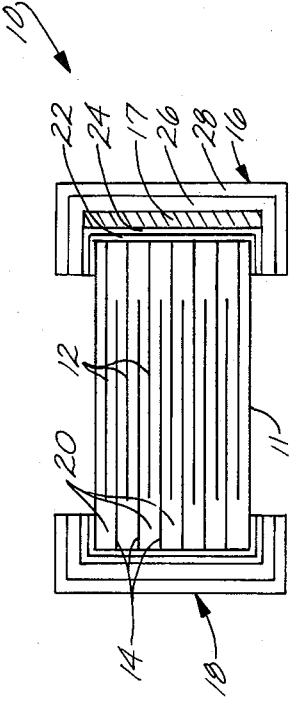
FIG. 2 is a schematic sectional view of a capacitor in accord with the preferred embodiment of the present invention with metallized films on both ends of the capacitor shown on an enlarged scale.

As schematically illustrated in cross section in FIG. 2, a capacitor 10 prepared according to the present invention comprises a multilayer chip portion 11. FIG. 2 shows the chip portion after it has been subject to machining removal of the central band of metallization which has previously been sputtered onto the entire MLC chip. This leaves only the end portions of the MLC capacitor covered with the nested metallization films. As FIG. 2 illustrates, a first set 12 and a second set 14 of the electrode-defining conductive layers are contained in the chip portion of the capacitor and extend in parallel and in an alternating fashion. The first set 12 of electrode-defining conductive layers of the MLC capacitor are electrically connected together at their edges by the nested metallization termination films at one end 16 of the MLC capacitor, and the second set 14 of electrode-defining conductive layers are electrically connected together at their edges by the nested metallization films at the opposite end of the MLC capacitor. The ceramic dielectric layers 20 between the electrode-defining layers of the capacitor are also shown in FIG. 2. The components of the metallization end terminations are shown on an enlarged scale for clarity.

The passivation layer 17 is located within termination end 16 of the MLC capacitor. A thin aluminum film 22 constitutes the innermost of the nested metallization films within end termination 16, and has a configuration such that a first portion of it is flush against the end of the chip and cooperates with the edges of the first set of conductive layers 12 to define parallel circuit paths. Another portion of the aluminum film 22 extends perpendicularly to the first portion. An equally thin palladium film 24 is nested directly over and has the same configuration as the aluminum film 21. The passivation layer 17 is thicker than and has a different configuration from any of the nested films. A nickel-copper alloy film 26 has a portion abutting the passivation layer 17 and a portion contacting the palladium film 24. A tin-lead film 28 is the outermost of the nested films and is in direct contact with the nickel-copper alloy film 26. The opposite end termination has all the same nested metallization films, but does not have the passivation layer, only one such passivation layer being needed to achieve the goal of providing a non-shorting multilayer capacitor in accord with this invention.

Thus, the end termination 16 is configured such that the innermost of the nested metallization films 22 has a portion that forms part of a circuit path bypassing the intermediate passivation layer 17 and has a portion that cooperates with the edges of the conductive layers of the first set to define parallel circuit paths. As to such bypass circuit path, it extends from the edge of a conductive layer 12, through an end-facing portion of the inner metallization films 22 and 24, and around the passivation layer 17 via the interface of the four metallization films 22, 24, 26, and 28, where they extend perpendicularly to the end surface of the chip. In accord with this invention, flow of current through one of the parallel circuit paths in excess of a current-limiting value causes that path to open, leaving other parallel circuit paths intact.

In the presently preferred embodiment of this invention, the end termination 16 includes thin conductive films of exothermically alloyable metals. These films are the aluminum and palladium films. They provide both for making electrical contact with the plurality of internal electrode-defining layers of the capacitor and to limit the amount of current each layer will conduct. The thickness of the aluminum and palladium films is chosen so as to provide a predetermined path length and a predetermined current limit. The invention allows for the effective electrical removal of separate internal conductive layers, which would otherwise conduct excessive current, by increasing the resistance in series with the affected layers. In use, if a short occurs in a dielectric layer between one of the parallel layers 12 and an adjacent parallel layer 14, power dissipation resulting from flowing current causes a rise in temperature at the interface of the affected layer 12 and the inner thin film termination. When the temperature rises to approximately 600° C., the aluminum/palladium films alloy, and become a very high resistance or open entirely, thereby removing the affected layer from being in parallel with the remaining electrode-defining layers. The passivation layer provides electrical insulation such that the outer nested film layers do not defeat the purpose of opening the current-flow path to the affected layer.

It has been shown by experiments that this temperature rise is very localized, involving a relatively small percentage portion (a few percent) of the contact area of one conductive layer. Furthermore, the rate of temperature rise in that small portion is high; accordingly, this small portion rapidly performs the current-limiting safe-guarding function and prevents a runaway failure within a short period of time that depends on the type of dielectric failure and the supply of current available. In experiments conducted with MLC capacitors constructed in accord with the preferred embodiment in which each of the two innermost metallization films is 250 Angstroms thick, no temperature rise has been detected in the capacitor body. This advantage is obtained because each of these very thin metallization films has a very low thermal mass and because the time constant for the two films to cooperate to perform the current-limiting function is very short.

The above-described presently preferred embodiment of a capacitor, and the presently preferred practice of the process for making it, are exemplary, and numerous alterations are within the scope of this invention. With respect to materials, suitable materials that can be used in lieu of aluminum and palladium include: an aluminum-magnesium alloy for film 22 and palladium for film 24; aluminum for film 22 and magnesium for film 24; aluminum for a single inner film in an embodiment having three nested films; platinum for film 22 and magnesium for film 24; an aluminum-magnesium alloy for film 22 and platinum for film 24. With respect to the manner of sputter-coating the metallization films, numerous alternative practices of the process described above are set out in the copending application cross referenced above.

The invention utilizes no external connections, false terminations, separate fusible wires, soldered or welded connections, or encapsulation. Due to the arrangement and properties of the termination, the invention derives advantages from the thin film termination itself and is not simply the addition of a fusible element in series with the finished MLC unit. The result is a monolithic MLC capacitor that does not fail in a shorted state. An additional feature of the invention is the very low equivalent series resistance (ESR) and very low added inductance afforded by the inherent mechanical and electrical properties of this termination that result because each conductive layer contained in the chip is individually connected to the outermost metallization film through a current-limiting path. Because of such individual connections in contrast to a single, series fusible connection, there is a substantially lower threshold of current limiting than has heretofore been possible; and the further advantage that a failure in one dielectric layer within the stack does not cause the capacitor to fail completely but instead the capacitor remains functional, albeit at a lower capacitance.

What is claimed is:
1. A multilayer capacitor comprising:
a multilayer capacitor chip containing first and second sets of conductive layers and alternating dielectric layers, with each of the layers of the first set having an edge defined at one end of the chip and with each of the layers of the second sets having an edge defined at the opposite end of the chip;

first and second end terminations, the first end termination electrically connecting together all the conductive layers of the first set at one end of the chip and the second end termination electrically connecting together all the conductive layers of the second set at the opposite end of the chip; and wherein the first end termination includes a plurality of nested metallization films, and an intermediate passivation layer, the innermost of the nested metallization films having a portion that forms part of a circuit path bypassing the intermediate passivation layer and having a portion that cooperates with the edges of the conductive layers of the first set to define parallel circuit paths, so that flow of current through one of the parallel circuit paths in excess of a current-limiting value causes that path to open, leaving other parallel circuit paths intact.

2. A multilayer capacitor in accord with claim 1, wherein the dielectric layers contained in the chip are ceramic.

3. A multilayer capacitor in accord with claim 2, wherein each end termination includes at least three sputter-coated nested metallization films.

4. A multilayer capacitor in accord with claim 3, wherein the innermost metallization film has a thickness of approximately 250 Angstroms.

5. A multilayer capacitor in accord with claim 4, wherein the innermost metallization film is aluminum.

6. A multilayer capacitor in accord with claim 2, wherein each end termination includes four sputter-coated metallization films, and wherein the two inner such films are exothermically alloyable.

7. A multilayer capacitor in accord with claim 6, wherein each of the two inner films has a thickness of approximately 250 Angstroms.

8. A process for providing end terminations on a multilayer capacitor chip to define a non-shorting capacitor, the chip containing first and second sets of conductive layers and alternating dielectric layers, with each of the layers of the first set having an edge exposed at one end of the chip and each of the layers of the second set having an edge exposed at the opposite end of the chip, the process comprising the steps of:
 (1) forming a first sputter-coated metallization film covering the opposite ends of the chip and extending between the opposite ends;
 (2) forming a second sputter-coated metallization film covering first film on the opposite ends of the chip and also extending between the opposite ends;
 (3) forming a passivation layer covering the second film on one end of the chip;
 (4) forming a third sputter-coated metallization film covering the passivation layer on the opposite ends of the chip and also extending between the opposite ends;
 (5) forming a fourth sputter-coated metallization film covering the third metallization film on the opposite ends of the chip and also extending between the opposite ends; and
 (6) removing the metallization films from the chip intermediate its ends sufficiently to eliminate every direct-current conductive path around the outside of the chip from one end to the other, leaving the metallization films on and surrounding each end thereof for electrical connection of the resulting capacitor to external electrical circuitry.

9. A process according to claim 8 wherein one of the first two sputter-coated metallization films is aluminum.

10. A process according to claim 9 wherein the other of first two sputter-coated metallization films is palladium.

11. A process according to claim 10 wherein the passivation layer is a fully idimized polyamide.

12. A process according to claim 8, wherein during the steps of forming the sputter-coated metallization films the chip tumbles so that each such film covers the entire exterior surface of the chip.

13. A process according to claim 8, and further including the step of tumbling the chip with an abrasive media after forming the last sputter-coated metallization film and before removing the metallization films.

14. A process for providing end terminations on each of many multilayer capacitor chips so that each defines a non-shorting capacitor, the process comprising:
 (1) loading a plurality of multilayer capacitor chips to be terminated into an evacuable enclosure;
 (2) heating the chips;
 (3) rotating the enclosure to tumble the chips;
 (4) evacuating the enclosure to produce a vacuum suitable for sputtering;
 (5) introducing an inert gas into said enclosure;
 (6) sputtering a first metallic material while the chips are tumbling to form on each of the chips a first sputter-coated metallization film covering its entire exterior surface;
 (7) sputtering a second metallic material while the chips are tumbling to form on each of the chips a second sputter-coated metallization film over all of the first film;
 (8) applying a passivation layer at one end of each chip;
 (9) sputtering a third metallic material while the chips are tumbling to form on each of the chips a third sputter-coated metallization film over the passivation layer and the second film;
 (10) sputtering a fourth metallic material while the chips are tumbling to form a fourth sputter-coated film over all of the third film; and
 (11) removing the metallization films from each chip intermediate its ends sufficiently to eliminate every direct-current conductive path around the outside of the chip from one end to the other, leaving the metallization films on and surrounding each end thereof for electrical connection of the resulting capacitor to external electrical circuitry.

15. A process according to claim 14 wherein the chips are removed from the evacuable enclosure after formation of the fourth film, placed in a second enclosure and thereafter burnished to render the outer metallization film more solderable.

16. A process according to claim 15 wherein the first metallic material is aluminum.

17. A process according to claim 16 wherein the second metallic material is palladium.

18. A process according to claim 17 wherein the third metallic material is a nickel alloy.

19. A process according to claim 18 wherein the fourth metallic material is a tin-lead alloy.

20. A process according to claim 14 wherein the passivation layer is a fully idimized polyamide.

21. A process according to claim 14 wherein the passivation layer is a UV cured dielectric epoxy.

* * * * *